(12) United States Patent
Daniels, Jr. et al.

(10) Patent No.: US 10,364,089 B2
(45) Date of Patent: Jul. 30, 2019

(54) POWDER CONTAINER AND METHOD OF USE

(71) Applicants: Ronnie Daniels, Jr., Stafford, TX (US); Christopher Bello, Missouri City, TX (US)

(72) Inventors: Ronnie Daniels, Jr., Stafford, TX (US); Christopher Bello, Missouri City, TX (US)

( * ) Notice: Subject to any disclaimer, the term of this patent is extended or adjusted under 35 U.S.C. 154(b) by 0 days.

(21) Appl. No.: 16/041,921

(22) Filed: Jul. 23, 2018

(65) Prior Publication Data

US 2018/0327174 A1    Nov. 15, 2018

Related U.S. Application Data

(63) Continuation-in-part of application No. 15/448,017, filed on Mar. 2, 2017, now Pat. No. 10,065,774.

(51) Int. Cl.

| | |
|---|---|
| *B65D 83/06* | (2006.01) |
| *B65D 47/08* | (2006.01) |
| *B65D 47/26* | (2006.01) |
| *B65D 25/04* | (2006.01) |
| *B65D 25/20* | (2006.01) |
| *B65D 1/16* | (2006.01) |
| *B65D 51/24* | (2006.01) |
| *A61J 1/03* | (2006.01) |
| *A61J 7/00* | (2006.01) |
| *B65D 1/04* | (2006.01) |
| *B65D 81/32* | (2006.01) |
| *G01F 11/20* | (2006.01) |

(52) U.S. Cl.
CPC ............... *B65D 83/06* (2013.01); *A61J 1/03* (2013.01); *A61J 7/0046* (2013.01); *A61J 7/0084* (2013.01); *B65D 1/165* (2013.01); *B65D 25/04* (2013.01); *B65D 25/20* (2013.01); *B65D 47/0895* (2013.01); *B65D 47/265* (2013.01); *B65D 51/242* (2013.01); *A61J 2205/40* (2013.01); *B65D 1/04* (2013.01); *B65D 81/32* (2013.01); *B65D 2251/023* (2013.01); *B65D 2251/04* (2013.01); *B65D 2251/1008* (2013.01); *B65D 2313/04* (2013.01); *G01F 11/20* (2013.01)

(58) Field of Classification Search
CPC .......... A61J 1/03; A61J 7/0046; A61J 7/0084; B65D 83/06; B65D 1/165; B65D 25/04; B65D 25/20; B65D 47/0895
USPC .. 222/41, 142.1, 142.3, 142.6, 142.9, 181.1, 222/185.1, 480, 553, 557, 556
See application file for complete search history.

(56) References Cited

U.S. PATENT DOCUMENTS

| | | | |
|---|---|---|---|
| 2,302,186 | A * | 11/1942 | Caretto ............... A47G 19/24 220/23.4 |
| 4,164,301 | A | 8/1979 | Thayer |
| 4,239,121 | A | 12/1980 | Hodes |
| 4,288,006 | A | 9/1981 | Clover, Jr. |
| 4,380,307 | A | 4/1983 | Stillinger |
| 4,583,667 | A | 4/1986 | Fishman |
| 5,186,366 | A | 2/1993 | Meisner |

(Continued)

*Primary Examiner* — Vishal Pancholi
(74) *Attorney, Agent, or Firm* — Ira Domnitz

(57) ABSTRACT

A materials containment canister comprising an optional lower cap with an upper thread, a body with multiple interior chambers and an upper cap with a lid, optional handle and orifice. The upper cap is capable of rotating to allow for the orifice to access individual chambers which can store materials.

19 Claims, 14 Drawing Sheets

(56) References Cited

U.S. PATENT DOCUMENTS

| | | | |
|---|---|---|---|
| 5,495,962 A * | 3/1996 | Nomura | A47G 19/34 |
| | | | 222/240 |
| 5,601,213 A | 2/1997 | Daniello | |
| 5,845,816 A | 12/1998 | Krane | |
| 5,890,627 A | 4/1999 | Storey | |
| 6,708,735 B1 | 3/2004 | Kenihan | |
| 6,733,095 B1 | 5/2004 | Rieb | |
| 7,159,720 B2 | 1/2007 | Pearson | |
| 7,571,811 B2 | 8/2009 | Mulaw | |
| 7,909,212 B2 * | 3/2011 | Parve | B65D 47/0847 |
| | | | 222/480 |
| 8,534,502 B2 | 9/2013 | Gold | |
| 8,670,865 B2 | 3/2014 | Coe | |
| 8,701,941 B2 * | 4/2014 | Fuller | A47G 19/24 |
| | | | 222/148 |
| 8,925,768 B1 | 1/2015 | Ismail | |
| 9,868,572 B2 * | 1/2018 | Vogel | B65D 51/18 |
| 2006/0213926 A1 | 9/2006 | Kraus | |
| 2009/0127263 A1 | 5/2009 | Hylton | |
| 2012/0043348 A1 * | 2/2012 | Sunatori | B65D 51/242 |
| | | | 222/142.3 |

* cited by examiner

POWDER CONTAINER AND METHOD OF USE

CROSS-REFERENCE TO RELATED APPLICATIONS

This application is a Continuation-in-Part and claims priority to U.S. patent application Ser. No. 15/448,017, filed on Mar. 2, 2017, which is incorporated by reference herein in its entirety.

STATEMENT REGARDING FEDERALLY SPONSORED RESEARCH

Not applicable.

BACKGROUND

The present invention relates to a powder, or particulate container device that can be locked into position, in various stages, so as to prevent the opening, mixing and accidental spilling of powders or particulates.

The present invention is distinguished from the following prior art pieces in many ways.

U.S. Pat. No. 6,733,095 is directed to a powder holder device that requires a pivoted access door. The present invention does not require such a door.

U.S. Pat. No. 8,925,768 describes a rotatable divider in a solids materials holder comprising: i) a duct defining a volume, and ii) an exterior rim configured to be manipulated by a user. The present invention does not require such a duct to define volume as well as a rim to configure said volume.

U.S. Pat. No. 8,670,865 discloses a docking station being connected to said housing and also requires the use of a multifunctional, interactive, wireless device. The present invention requires neither a docking station nor multifunctional, interactive, wireless device.

U.S. Pat. No. 5,762,199 discloses two snap hinges that communicate the two-piece cap with the base. The present invention does not require such hinges to hold cap onto base or a two-piece cap. The present invention only uses one cap that attaches to the base.

U.S. Pat. No. 4,164,301 claims both an upper and lower "cover" that act as an opening lock. The present invention does not require a two-part cap to function properly.

U.S. Pat. No. 7,571,811 claims a portable cabinet with a base and central tubular support column. The present invention does not utilize such a portable cabinet with openings for at least one drawer.

U.S. Pat. No. 4,583,667 includes a lid with an annular sidewall to dispense items within. The present invention allows for dispensing of materials via the top of the lid, which flips open. The present invention has a lid that can only be secured in one predetermined position.

U.S. Pat. No. 5,845,816 has two flap lids on "living hinges," while the present invention only has one lid. The present invention has a lid that can only be secured in one predetermined position along tracks of varying sizes. The '816 invention claims an upper cover over the first container and a lower cover over the second. Whereas the present invention has one compartment throughout the height of the device.

U.S. Pat. No. 5,890,627 has a lid that snaps atop the container. The present invention has a lid that can only be secured in one predetermined position along tracks of varying sizes. U.S. Pat. No. 4,583,667 does not utilize a compartment lock as is such with the present invention. This novel feature prevents the contamination of materials that are housed within the present invention.

U.S. Pat. No. 6,708,735 does not disclose individual compartments. The invention of '735 claims a lid closure adapted to dispense a material into a container comprising a first lid part and a second lid part with pockets. The present invention only has one lid closure that allows the user to access substance inside the device. The present invention also has a lid that snaps into the base of the container.

U.S. Pat. No. 7,159,720 has a dispensing orifice on the side of the invention. The present invention has a dispensing orifice which is on the top of the invention via the flip-top lid. The invention of '720 also claims a top and bottom shell that are mated and have a center pin that connects both shells. The present invention has a lid that rotates on a track and does not have a center pin that goes all the way through.

U.S. Pat. No. 8,534,502 is distinguished from the present invention as the present invention has a rotatable compartment with individual side orifices used to dispense soluble materials upon activation. The present invention does not utilize such an axis of rotation or even contain a removable cap that contains the materials within the said compartments. The present invention does not use, nor require, a bottom orifice for dispensing materials. All materials on the present invention are either loaded or dispensed from the top orifice. The present invention also utilizes a solid lid absent of any orifices for dispensing soluble materials. The present invention also utilizes a removable cap used to secure soluble materials.

US20060213926 is distinguished from the present invention, as the present invention utilizes a ball that allows the lid to rotate about the axis. In the '926 application, each individual compartment has its own separate outlet for dispensing soluble materials.

US20090127263 does not allow the lid to rotate. US Pat. Application '263 also requires an air space between adjacent wall portions unlike the present invention.

SUMMARY

The present invention is a new, and novel, design for containment of particulate matter or potentially fluids.

In several embodiments of the present invention, there are tracks on the outside of the base container to engage or disengage the lid. In several embodiments of the present invention, the lid can only be put on or taken off in one predetermined location (where the indicators meet). In several embodiments of the present invention, once the flip top lid is closed, it engages the inside of the base container and locks the lid in place, preventing the lid from rotating. When the lid is opened, the entire cap can rotate 360°. In several embodiments of the present invention, a funnel can be screwed onto the base of container for convenience. In several embodiments, the lid cap utilizes a magnetic latching system.

The present invention generally relates to organizing and transporting medication or supplements in pill or powder form. Americans are constantly being sold meal plans and supplementary products, for which timing and portions are crucial for results. The present invention will allow users to carry multiple medications, vitamins, or supplements in a compact, portable container. The user can flip the top open, rotate the lid along the track, and pour out supplements from segregated compartments during various parts of the day.

A Forbes article titled "Nutritional Supplements Flexing Muscles As Growth Industry" mentions that the supplement industry (Vitamins, Minerals, and Supplements, or VMS)

produced about $32 billion in revenue in 2012. This is projected to double to $60 billion by 2021 according to the Nutritional Business Journal. See https://www.forbes.com/sites/davidlariviere/2013/04/18/nutritional-supplements-flexing-their-muscles-as-growth-industry/#281f783c8845. There are currently not many convenient methods of carrying and portioning such supplements. The current options are few and still not sleek enough for the ideal daily carry. The present invention intends to simplify the problem for users and allows them to carry the required supplements in a convenient, compact, and portable device. In some embodiments, the present invention adds more carrying space in a gym bag for multiple powders.

In one embodiment of the present invention, the present invention allows users to easily carry portioned, or segregated, substances for removal and consumption at various times throughout the day. In some embodiments, the compartments are numbered in ascending order to assist the user in prioritizing throughout the day. In several embodiments, the device comes in a clear, plastic container to allow user to verify contents of each compartment. In several embodiments, the container is of a nonopaque material.

In several embodiments, the present invention is a materials containment canister comprising: a lower cap; said lower cap further comprising a lower cap upper thread, a frustoconical side slant cone, and a spout attached to the bottom edge of said frustoconical side slant cone; a body; said body is substantially hollow with multiple chambers running the length of the interior of said body and being separated by a multi walled divider; said body is comprised with a lower body thread capable of engaging said lower cap upper thread; said body is comprised with an upper body track; said upper body track has an upper cap interface; an upper cap; said upper cap has an upper body track interface capable of interfacing with said upper cap interface; said upper cap has a top face with an orifice; said top face is attached to a base; said base is further attached to a handle and a lid with a lower wedge; wherein said lower wedge is capable of sealably engaging said orifice. In several embodiments, said base has a first magnetic attachment on the upper face of said base; said lid has a second magnetic attachment on the upper face of said lid of opposing polarity to said first attachment; wherein said first and second magnetic attachments are capable of magnetically engaging each other, therein maintaining said lid in mechanical communication with said base. In several embodiments, said upper cap is rotatable about said upper body track when said lid is disengaged from said orifice. In several embodiments, said upper cap is locked about said upper body track when said lid is engaged with said orifice. In several embodiments, said body is further constructed with grips. In several embodiments, said body is further constructed with indentions on the upper surface that correspond with the locations of one of said multiple chambers in the interior of said body. In several embodiments, said body is further constructed with an indentation on said lid that corresponds with the location of said orifice. In several embodiments, said body is threadably attached to said lower cap. In several embodiments, the upper cap can only be removed from said body when the indentions on the upper lip and the cap are in proper alignment.

In several embodiments, the present invention is a method for using a materials containment canister comprising the steps of: providing a materials containment canister comprising; a lower cap; said lower cap further comprising a lower cap upper thread, a frustoconical side slant cone, and a spout attached to the edge of said frustoconical side slant cone; a body; said body is substantially hollow with multiple chambers running the length of the interior of said body and being separated by a multiple-walled divider; said body is comprised with a lower body thread capable of engaging said lower cap upper thread; said body is comprised with an upper body track; said upper body track has an upper cap interface; an upper cap; said upper cap has an upper body track interface capable of interfacing with said upper cap interface; said upper cap has a top face with an orifice; said top face is attached to a base; said base is further attached to a handle and a lid with a lower wedge; wherein said lower wedge is capable of sealably engaging said orifice; and sealing said orifice with said lower wedge. In several embodiments, the invention further comprises: said base has a first magnetic attachment on the upper face of said base; said lid has a second magnetic attachment on the upper face of said lid of opposing polarity to said first attachment; magnetically engaging said first and second magnetic attachments with each other therein maintaining said lid in mechanical communication with said base. In several embodiments, the method further comprises the step of: rotating said upper cap about said upper body track when said lid is disengaged from said orifice. In several embodiments, the method further comprises the step of: locking said upper cap about said upper body track when said lid is engaged with said orifice. In several embodiments, the method further comprises the step of: constructing said body with grips. In several embodiments, the method further comprises the step of constructing said body with indentions on the upper surface that correspond with the locations of one of said multiple chambers in the interior of said body. In several embodiments, the method further comprises the step of constructing said body with an indentation on said lid that corresponds with the location of said orifice. In several embodiments, the method further comprises the step of threadably attaching said body to said lower cap.

In several embodiments, the present invention is a materials containment canister comprising: a lower cap; said lower cap further comprising a lower cap upper thread, a frustoconical side slant cone, and a spout attached to the edge of said frustoconical side slant cone; a body; said body is substantially hollow with multiple chambers running the length of the interior of said body and being separated by a multi-walled divider; said body is comprised with a lower body thread capable of engaging said lower cap upper thread; said body is comprised with an upper body track; said upper body track has an upper cap interface; an upper cap; said upper cap further comprising a top cap top, a base and a lid complex; said top cap top further comprising; base extension and engagement face with guide tracks; said lid complex further comprising: a lid upper piece with engagement knobs and a dove tail track; a lower piece orifice engagement and a dove tail engagement. In some embodiments, said base has a first magnetic attachment on the upper face of said base; said lid has a second magnetic attachment on the upper face of said lid of opposing polarity to said first attachment; wherein said first and second magnetic attachments are capable of magnetically engaging each other therein maintaining said lid in mechanical communication with said base; said base extension has a third magnetic attachment of opposing polarity to said second attachment; wherein said third and second magnetic attachments are capable of magnetically engaging each other. In some embodiments, said body is further constructed with grips. In some embodiments, said body is further constructed with indentions on the upper surface that correspond with the locations of one of said multiple chambers in the interior of said body. In some embodiments, said body is further constructed with an indentation on said lid that corresponds with the location of said orifice. In some embodiments, said body is threadably attached to said lower cap. In some embodiments, said body is tapered from the area nearest the upper cap to the area nearest the lower cap.

In some embodiments, the present invention is a method for using a materials containment canister comprising the steps of: providing a materials containment canister comprising; a lower cap; said lower cap further comprising a lower cap upper thread, a frustoconical side slant cone, and a spout attached to the edge of said frustoconical side slant cone; a body; said body is substantially hollow with multiple chambers running the length of the interior of said body and being separated by a multi-walled divider; said body is comprised with a lower body thread capable of engaging said lower cap upper thread; said body is comprised with an upper body track; said upper body track has an upper cap interface; an upper cap; said upper cap further comprising a top cap top and a lid complex; said top cap top further comprising; base extensions and engagement faced with guide tracks; said lid complex further comprising: a lid upper piece with engagement knobs and a dove tail track; a lower piece orifice engagement and a dove tail engagement. In some embodiments, the method further comprises: said base has a first magnetic attachment on the upper face of said base; said lid has a second magnetic attachment on the upper face of said lid of opposing polarity to said first attachment; wherein said first and second magnetic attachments are capable of magnetically engaging each other therein maintaining said lid in mechanical communication with said base; said base extension has a third magnetic attachment of opposing polarity to said second attachment; wherein said third and second magnetic attachments are capable of magnetically engaging each other. In some embodiments, the method is further comprising the step of: constructing said body with grips. In some embodiments, the method is further comprising the step of: constructing said body with indentions on the upper surface that correspond with the locations of one of said multiple chambers in the interior of said body. In some embodiments, the method is further comprising the step of: constructing said body with an indentation on said lid that corresponds with the location of said orifice. In some embodiments, the method is further comprising the step of: threadably attaching said body to said lower cap.

In some embodiments, the invention is a materials containment canister comprising: a lower cap; said lower cap further comprising a lower cap body attachment, a frustoconical side slant cone, and a spout attached to the edge of said frustoconical side slant cone; a body; said body is substantially hollow with multiple chambers running the length of the interior of said body and being separated by a multi-walled divider; said body is comprised with a lower body attachment capable of engaging said lower cap body attachment; said body is comprised with an upper body track; said upper body track has an upper cap interface; an upper cap; said upper cap further comprising a top cap top and a lid complex; said top cap top further comprising; base extensions and engagement faced with guide tracks; said lid complex further comprising: a lid upper piece with engagement knobs and a dove tail track; a lower piece orifice engagement and a dove tail engagement.

In some embodiments, the present invention is a materials containment canister comprising: a body; said body is substantially hollow with multiple chambers running the length of the interior of said body and being separated by a multi-walled divider; said body is comprised with an upper body track; said upper body track has an upper cap interface; an upper cap; said upper cap further comprising a top cap top, a base and a lid complex; said top cap top further comprising; base extension and engagement face with guide tracks; lid complex further comprising: a lid upper piece with engagement knobs and a dove tail track; a lower piece orifice engagement and a dove tail engagement. In some embodiments, said base has a first magnetic attachment on the upper face of said base; said lid has a second magnetic attachment on the upper face of said lid of opposing polarity to said first attachment; wherein said first and second magnetic attachments are capable of magnetically engaging each other, therein maintaining said lid in mechanical communication with said base; said base extension has a third magnetic attachment of opposing polarity to said second attachment; wherein said third and second magnetic attachments are capable of magnetically engaging each other. In some embodiments, said body is further constructed with grips. In some embodiments, said body is further constructed with indentions on the upper surface that correspond with the locations of one of said multiple chambers in the interior of said body. In some embodiments, said body is further constructed with an indentation on said lid that corresponds with the location of said orifice. In some embodiments, there is a lower cap; said lower cap further comprising a lower cap upper thread; a frustoconical side slant cone, and a spout attached to the edge of said frustoconical side slant cone; said body is further comprised with a lower body thread capable of engaging said lower cap upper thread. In some embodiments, said body is threadably attached to said lower cap. In some embodiments, there is a body which is tapered from the area nearest the upper cap to the area nearest the lower cap.

In some embodiments, the present invention is a method for using a materials containment canister comprising the steps of: providing a materials containment canister comprising; a body; said body is substantially hollow with multiple chambers running the length of the interior of said body and being separated by a multi-walled divider; said body is comprised with an upper body track; said upper body track has an upper cap interface; an upper cap; said upper cap further comprising a top cap top and a lid complex; said top cap top further comprising; base extensions and engagement faced with guide tracks; said lid complex further comprising: a lid upper piece with engagement knobs and a dove tail track; and a lower piece orifice engagement and a dove tail engagement. In several embodiments, said base has a first magnetic attachment on the upper face of said base; said lid has a second magnetic attachment on the upper face of said lid of opposing polarity to said first attachment; wherein said first and second magnetic attachments are capable of magnetically engaging each other, therein maintaining said lid in mechanical communication with said base; said base extension has a third magnetic attachment of opposing polarity to said second attachment; wherein said third and second magnetic attachments are capable of magnetically engaging each other. In several embodiments, there are the additional steps of constructing said body with grips. In several embodiments, there are the additional steps of providing a lower cap; said lower cap further comprising a lower cap upper thread; a frustoconical side slant cone, and a spout attached to the edge of said frustoconical side slant cone; said body is further comprised with a lower body thread capable of engaging said lower cap upper thread.

In some embodiments, the present invention is a materials containment canister comprising: a body; said body is substantially hollow with multiple chambers running the length of the interior of said body and being separated by a multi-walled divider; said body is comprised with an upper body track; said upper body track has an upper cap interface; an upper cap; said upper cap further comprising a top cap top and a lid complex; said top cap top further comprising; base extensions and engagement faced with guide tracks; said lid complex further comprising; a lid upper piece with engagement knobs and a dove tail track; and a lower piece orifice engagement and a dove tail engagement. In some embodiments, there is a lower cap; said lower cap further comprising a lower cap upper thread; a frustoconical side slant cone, and a spout attached to the edge of said frustoconical side slant cone; said body is further comprised with a lower body thread capable of engaging said lower cap upper thread. In some embodiments of the present invention, said body is threadably attached to said lower cap.

BRIEF DESCRIPTION OF THE DRAWING

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
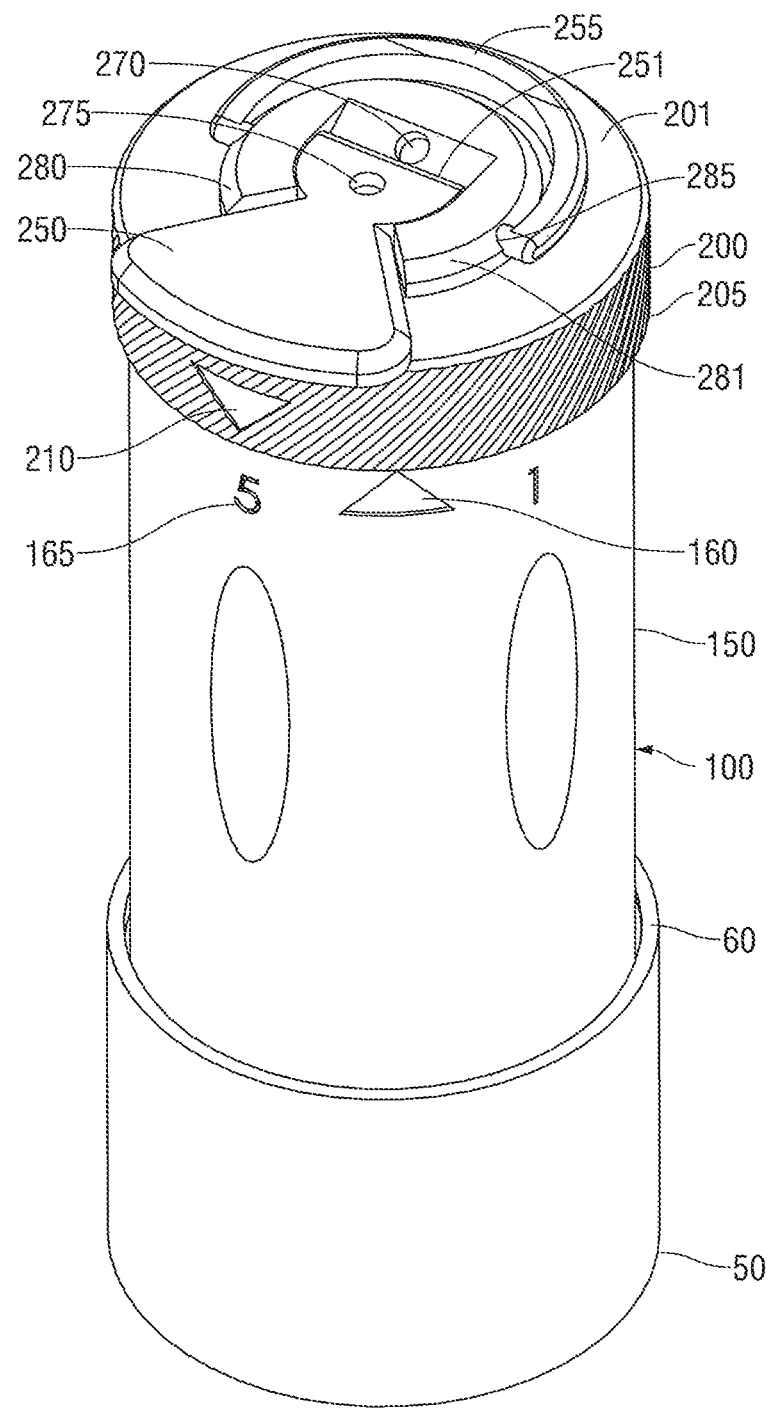
FIG. 1 is an assembled view of one embodiment of the present invention in top perspective.

One or more illustrative embodiments incorporating the invention disclosed herein are presented below. Applicant has created a revolutionary and novel particulate and/or powder storage and dispensing canister and method of use of the same.

In the following description, certain details are set forth such as specific quantities, sizes, etc. so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing particular embodiments of the disclosure and are not intended to be limiting thereto. Drawings are not necessarily to scale and arrangements of specific units in the drawings can vary.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 11th Edition, 2008. Definitions and/or interpretations should not be incorporated from other patent applications, patents, or publications, related or not, unless specifically stated in this specification or if the incorporation is necessary for maintaining validity. Specifically defined terms: As utilized herein, "frustoconical" means any substantially funnel shape with a top portion of greater width than the lower portion.

Certain terms are used in the following description and claims to refer to particular system components. As one skilled in the art will appreciate, different persons may refer to a component by different names. This document does not intend to distinguish between components that differ in name, but not function. The drawing figures are not necessarily to scale. Certain features of the invention may be shown exaggerated in scale or in somewhat schematic form, and some details of conventional elements may not be shown, all in the interest of clarity and conciseness.

Although several preferred embodiments of the present invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

FIG. 1 is an assembled view of one embodiment of the present invention in top perspective. As shown in this embodiment, inventive canister 100 is composed of multiple assembled units. In several embodiments, the canister 100 may be constructed of a lightweight plastic, metal, or other durable material. It is also envisioned that the physical shape of the present invention can be modified from a general cylindrical shape into some other shapes as long as the functionality is preserved.

As shown is bottom cap 50. In several embodiments of the present invention bottom cap 50 may be constructed of any materials that are capable of maintaining a rigid shape, such as plastics, light weight metals, or the like. As shown, bottom cap 50 is releasable attached to main body 150. In several embodiments, this attachment occurs through threading 25 (see FIG. 4). Other attachment methods as known in the art can be implemented though. In several embodiments, bottom cap 50 has an outer wall that is substantially cylindrical in shape.

In several embodiments, body 150 may be constructed of any materials that are capable of maintaining a rigid shape, such as plastics, light weight metals, or the like. In many embodiments, body 150 is substantially cylindrical in exterior shape and can have gripping indentions 130, as shown. In several embodiments, main body 150 may be formed with different shapes. Body 150, may also be formed in various heights to allow for more or less materials. Body's 150, interior walls may also include more or less walls thus constructing various internal orifices.

Further illustrated is that body 150 may be constructed with identification indentions 165 use to help users ascertain which internal containment enclosure 310*a-e* (See FIG. 3) is aligned with the flip lid 250 when in use. Body 150 can also have secondary indentations 160 utilized to align body 150 with top cap 200 in certain uses of the present invention. Where the two triangles on the device 160 and 210 meet, the entire cap can be attached. Once turned, there are extrusions on the inner cap that keep hold within the track 146 (See FIG. 3). These extrusions will allow 210 to rotate freely about the axis without the possibility of being removed at any other position other than the one stated above.

Figure 5:
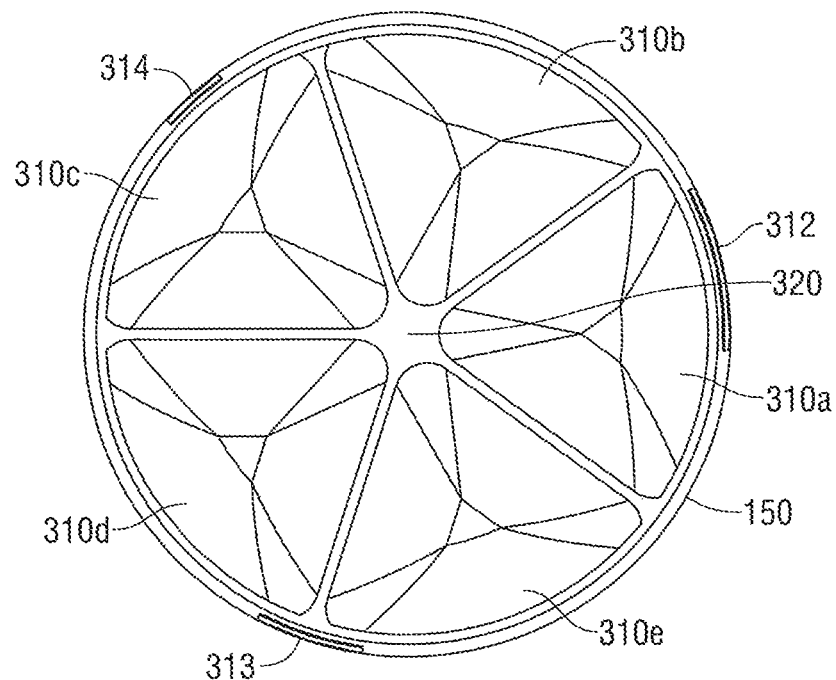
FIG. 5 is an assembled view of one embodiment of the present invention of the reservoir in top perspective.
Figure 13:
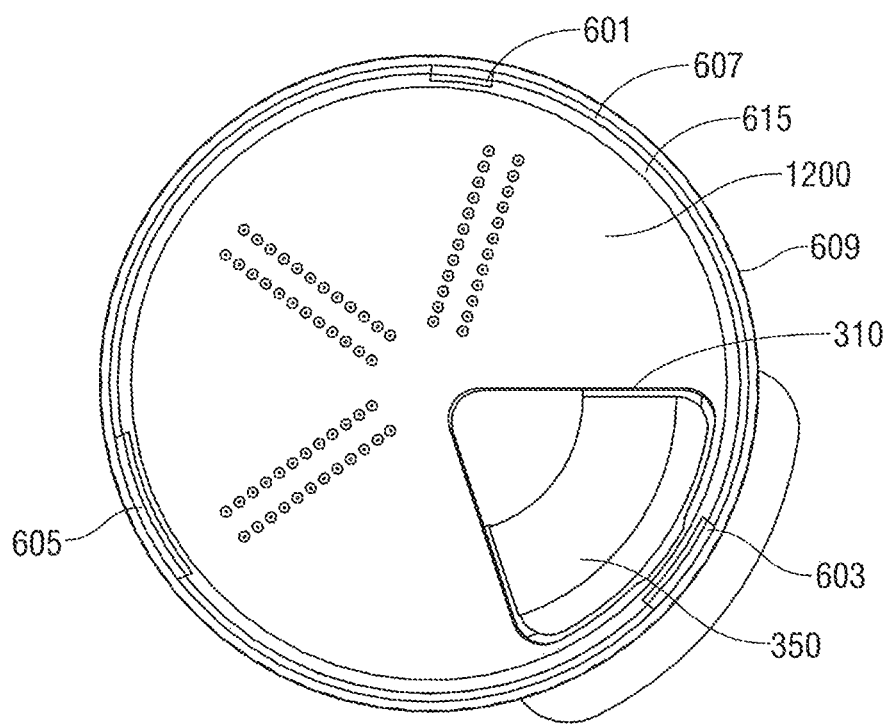
FIG. 13 is an assembled view of one embodiment of the present invention of the top cap top.

In several embodiments, there are three different sized extrusions that allow the cap 200 to only be put on where the arrows align. If a user attempts to put the cap 200 on from any other angle, it won't work due to specific and variant extrusion size. FIG. 13 actually illustrates the tabs 601, 603, and 605 as well as inner track engagement 615 which can slideably interact with the upper portion of body 150 when top cap 200 is engaged. As shown in FIG. 5, variant size attachment notches 314, 312 and 313 are seen around the circumference of the body 150. In several embodiments, the notches 314, 313, and 312 are of different sizes to allow for the top cap 200 to only be put on or taken off at a certain angle through interface with tabs 601, 603, 605 respectively (See FIG. 13). At any other rotated angle, the top cap 200 won't fit (a bigger track would be aligned with a smaller one and therefore not fit).

FIG. 1 also illustrates top cap 200. In several embodiments, top cap 200 may be designed with side grip ridges 205 to assist a user in rotating top cap 200. Further shown is lid indention 210, which in some embodiments, can align with indention 160 when rotated to allow for removal or placement of top cap 200 on body 150. The lid 250, when engaged with top cap top 201 can no longer be rotated about the axis of body 150. This communication helps prevent accidental contamination of said materials dispensed in said orifices 310*a-e* (See FIG. 3). Indentions 210 and 160 can be of any geometric shape. Top cap 200 may be constructed of any materials that are capable of maintaining a rigid shape. In several embodiments, where the two triangles on the device 160 and 210 meet, the entire top cap 200 can be attached to body 150. Once the top cap 200 is turned, there are extrusions on the inner cap that keep hold within the track 146 (See FIG. 3). In several embodiments, the track 146 (See FIG. 3) is recessed into body 150. The extrusions 601, 603 and 605 (See FIG. 13) on the top cap 200 rotate about this axis.

In several embodiments, top cap 200 is constructed with lip complex 280. In several embodiments, complex 280 is constructed with magnetic attachment 270, lid 250, second magnetic attachment 275, handle 255 and handle attachment 285. As shown, handle attachment 285 is substantially attached and can rotate about base 281 of complex 280, such that handle 255 can rotate away from, or towards, top cap top 201. Top cap 200 can be of a variety of different geometric shapes as long as the physical requirements of the present invention are met. The rotation is about the axis as defined by handle attachment 285.

In many embodiments, handle attachment 285 forms a handle 255 which fits around base 281 in a manner known in the art and extending approximately one hundred and eighty degrees around base 281. Handle 255 is preferably constructed in such a manner as to support the weight of the canister invention 100 (even when filled) through lifting. Handle 255 may be constructed of any materials that are capable of maintaining a rigid shape.

Attached on top of base 281 is magnetic attachment 270. Magnetic attachment 270 can be of positive or negative alignment, but needs to be in opposite alignment to magnetic attachment 275. Also, attached to base 281, in a manner known in the art, is flip lid 250. Flip lid 250 is preferably designed to rotatably engage base 281 at attachment point 251 such that the portion of flip lid 250 distal to attachment 251 can rotate away or towards base or cap top 281.

In one embodiment, magnetic attachment 275 is on flip lid 250 and arranged such that it can releasably engage mechanical attachment 270, therein maintaining flip lid 250 in an open position relative to top cap 200. In several embodiments, once the flip top 250 is closed, it mechanically engages into the inside of the chamber wall of body 150 and locks top cap 200 into place relative to body 150. This prevents the triangles 160 and 210 from aligning accidentally therein allowing top cap 200 to potentially come off. In several embodiments, once the flip top 250 is closed, it digs into the inside of the chamber wall and locks it into place. In some embodiments, there is some thickness to 250 in the shape of the triangle to prevent the lid from turning unless 250 is flipped open. This prevents the arrows from aligning accidentally and the lid 200 potentially coming off.

Figure 2:
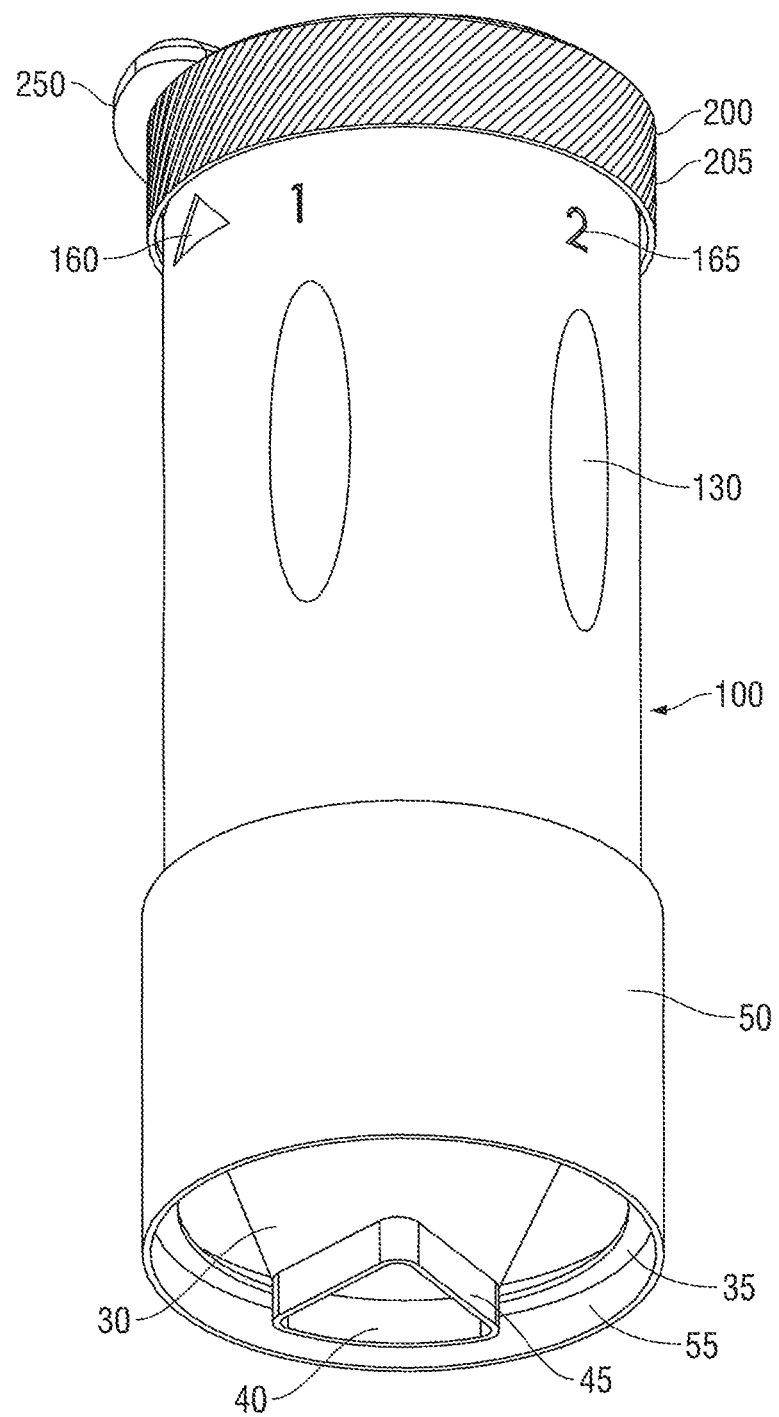
FIG. 2 is an assembled view of one embodiment of the present invention in bottom perspective.

FIG. 2 is an assembled view of one embodiment of the present invention in bottom perspective. Illustrated are hand grips 130 which can be indentions or extrusions from body 150. Shown in further detail is lower cap 50. Lower cap 50, in many embodiments has a spout 40 with outer edge 45. In several embodiments, spout 40 fits into each individual chamber 310*a-e* (See FIG. 3). This provides support so that frustoconical side slant cone 30 can rest on the overall container 100 while the user pours powders into various chambers 310*a-e* (See FIG. 3). In several embodiments, the edge, or spout, 40 can fit into each individual chamber 310*a-e* (See FIG. 3) when in use. This fit provides support so that the spout 40 can rest on the lid cap 200 while the user pours powders into various chambers 310*a-e* (See FIG. 3). Frustoconical side slant cone 30, in several embodiments, can act as a funnel for materials when bottom cap 50 is placed over top cap 200 and engaged. As shown, bottom cap 50 can screw into the bottom of the body 150. Also illustrated is bottom side ridge 55 and inner ridge 35 which are preferably designed to allow the bottom cap 50 to be stabilized when sitting on top of the body 150.

Figure 3:
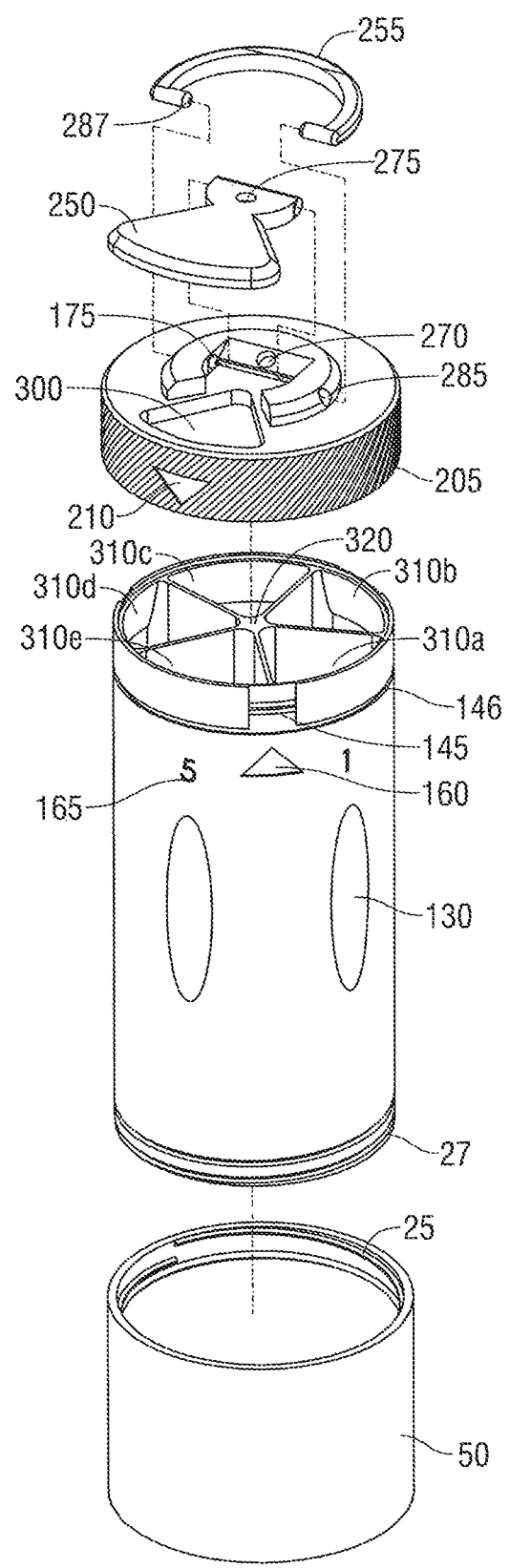
FIG. 3 is a view of one embodiment of the present invention in exploded view.

FIG. 3 is a view of one embodiment of the present invention in exploded view. As shown is bottom cap 50. Further illustrated is screw thread 25 on the top portion of bottom cap 50. In several embodiments of the present invention, screw thread 25 can mechanically engage screw thread 27 in a manner known in the art to have lower cap 50 engage body 150. Other attachment embodiments can be utilized as well. Further illustrated is track alignment knob 145 which is preferably aligned with indention 160 as to allow a user to visually see when top cap 200 alignment indention 210 is aligned with knob 145. Illustrated further are interior compartments 310a-e which are open containment sections with wall divider 320 separating them. In preferred operation, when materials are placed into any one of containers 310a-e they cannot interface with material in another container.

Illustrated further is orifice 300 on top cap 200 which is designed to preferably align with one of containers 310a-e when in operation by a user such that materials from only one individual container could be removed or placed into one of said containers 310a-e. In several embodiments of the present invention, the interior of containers 310a-e is substantially shaped as a wedge with extended depth.

Figure 4:
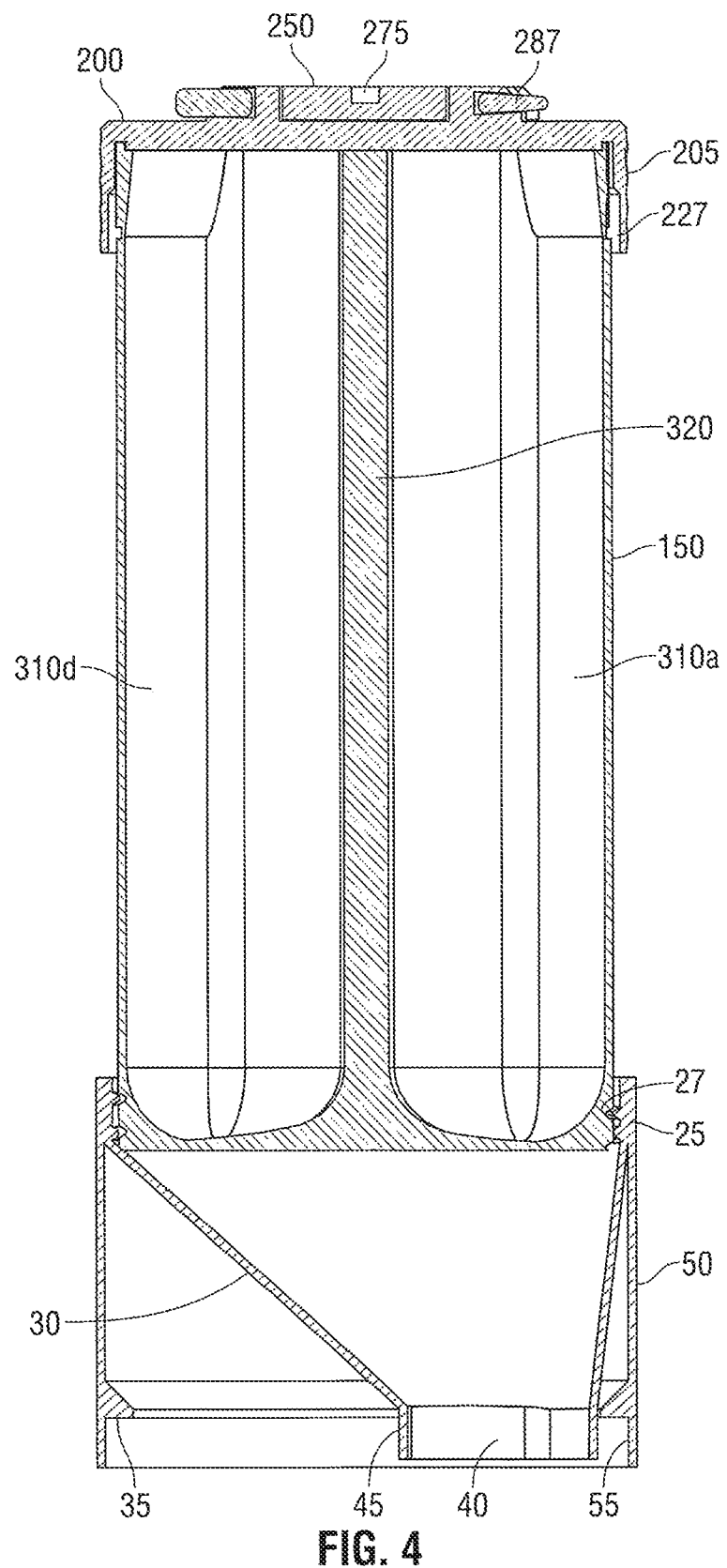
FIG. 4 is an assembly cross section view of one embodiment of the present invention.

FIG. 4 is an assembled cross sectional view of one embodiment of the present invention. As illustrated, the interior of containers 310d and 310a are shown so that the capacity for storage of materials is completely appreciated. In this embodiment, threads 27 and 25 are engaged such that bottom cap 50 is in mechanical communication with body 150. Shown is rotational track 227 of body 150 as it engages top cap 200.

Shown on lower cap 50 is the frustoconical side slant cone 30. Further shown is the outer edge 45 and the spout 40. Side ridge 55 and inner ridge 35 are also shown.

FIG. 5 is an assembled view of one embodiment of the present invention of the reservoir in top perspective. As illustrated, reservoirs or containers 310a-e are shown with five faced wall divider 320. Variant embodiments with multiple chambers can also be utilized in the present invention. Variant size attachment notches 314, 312 and 313 are seen around the circumference of the body 150. In several embodiments, the notches 314, 312, and 313 are of different sizes to allow for the top cap 200 to only be put on or taken off at a certain angle. At any other rotated angle, the top cap 200 won't fit (a bigger track would be aligned with a smaller one and therefore not fit).

Figure 6:
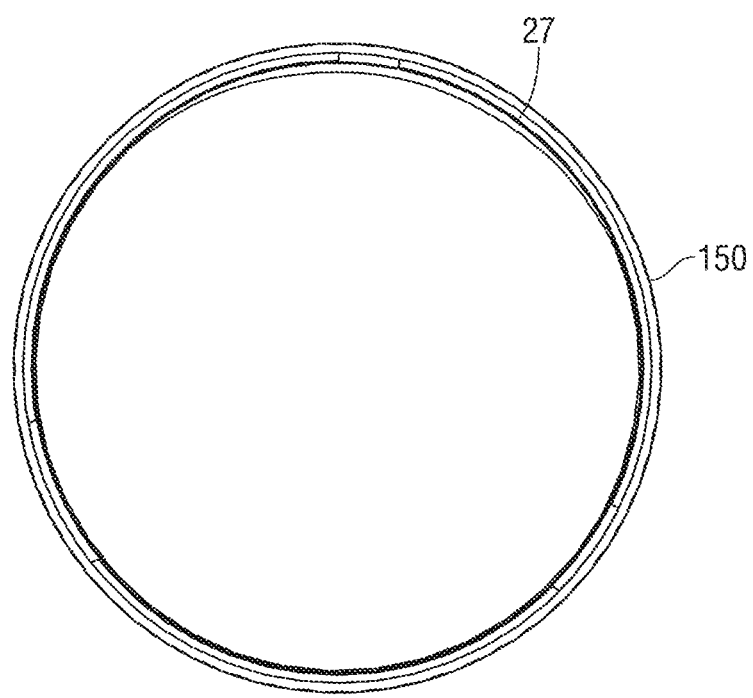
FIG. 6 is an assembled view of one embodiment of the present invention of the reservoir in bottom perspective.

FIG. 6 is an assembled view of one embodiment of the present invention of the reservoir in bottom perspective. As shown is the screw thread 27. In several embodiments, a user can screw, or unscrew, the bottom cap 50 (See FIG. 3) from the body 150. It is envisioned that in several other embodiments of the present invention, other attachment methodologies can be implemented.

Figure 7:
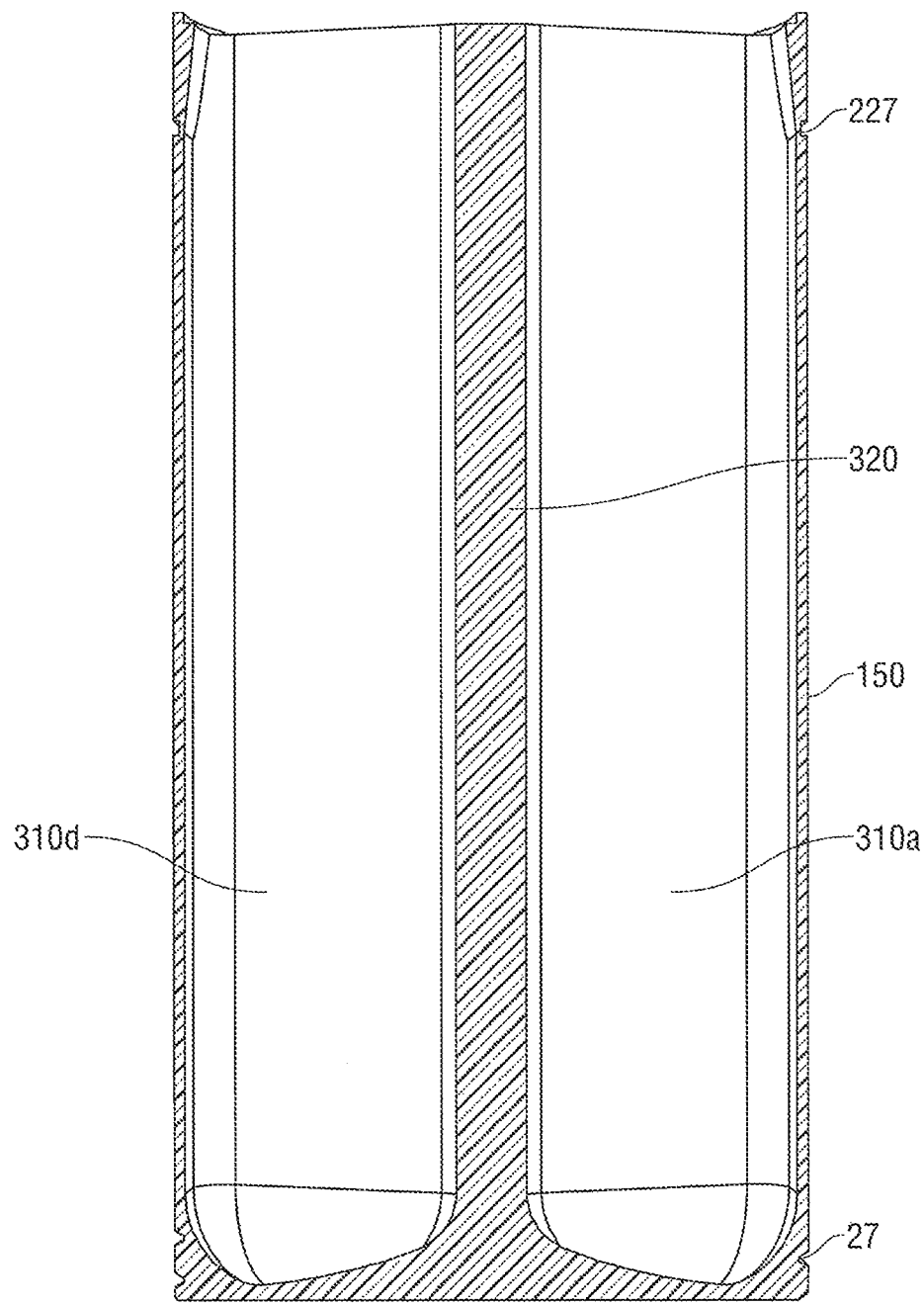
FIG. 7 is an assembled view of one embodiment of the present invention of the reservoir in cross section.

FIG. 7 is an assembled view of one embodiment of the present invention of the reservoir in cross section. As shown, divider 320 is visible as is screw thread 27. In many embodiments of the present invention, body 150 and divider 320 can be composed of one solid piece of material. Further shown is rotational track 227 on the upper portion of body 150.

Figure 8:
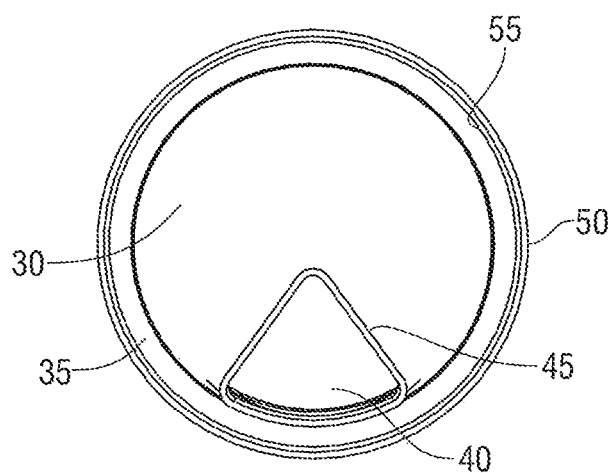
FIG. 8 is an assembled view of one embodiment of the present invention of the bottom cap bottom.

FIG. 8 is one embodiment of the cap bottom from bottom view. As shown, is bottom cap 50. Bottom cap 50 may be constructed of any materials that are capable of maintaining a rigid shape, such as plastics, light weight metals, or the like. As shown, bottom cap 50 is releasable attached to main body 150 (See FIG. 1). As shown, bottom cap 50 can screw into the bottom of the body 150 (See FIG. 1). Also illustrated is bottom side ridge 55 and inner ridge 35 which are preferably designed to allow the bottom cap 50 to be stabilized when sitting on top of the body 150 (See FIG. 1). Lower cap 50, in many embodiments has a spout 40 with outer edge 45. Frustoconical side slant cone 30, in several embodiments, can act as a funnel for materials when bottom cap 50 is placed over top cap 200 and engaged. In several embodiments of the present invention, top cap 200 can be engaged with body 150 (See FIG. 1) or not engaged when a powder is being added to any interior 310a-e (See FIG. 3).

Figure 9:
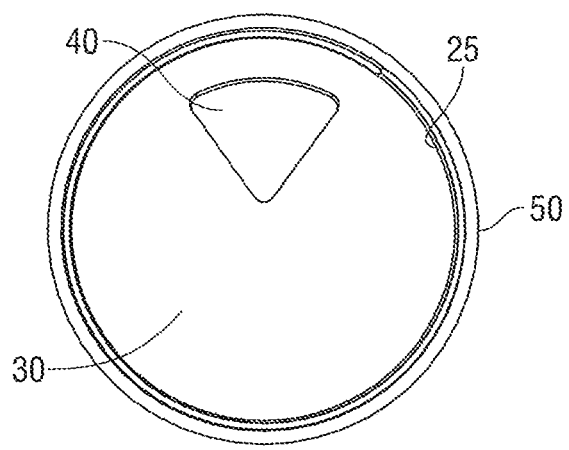
FIG. 9 is an assembled view of one embodiment of the present invention of the bottom cap top.

FIG. 9 is one embodiment of the cap bottom from top view. As shown, is bottom cap 50. Bottom cap 50 may be constructed of any materials that are capable of maintaining a rigid shape, such as plastics, light weight metals, or the like. As shown, bottom cap 50 is releasable attached to main body 150 (See FIG. 1). Bottom cap 50 is attached to the bottom portion of body 150 via threads 25 and 27 (See FIG. 4). In several embodiments of the present invention, screw thread 25 can mechanically engage screw thread 27 in a manner known in the art to have lower cap 50 engage body 150 (FIGS. 3 and 4). Lower cap 50, in many embodiments, has a spout 40 with outer edge 45 (See FIG. 8). In several embodiments, the edge, or spout, 40 can fit into each individual chamber 310a-e (See FIGS. 2 and 3) when in use. This fit provides support so that the spout 40 can rest on the top cap 200 while the user pours powders into various chambers 310a-e. (See FIGS. 2 and 3).

Figure 10:
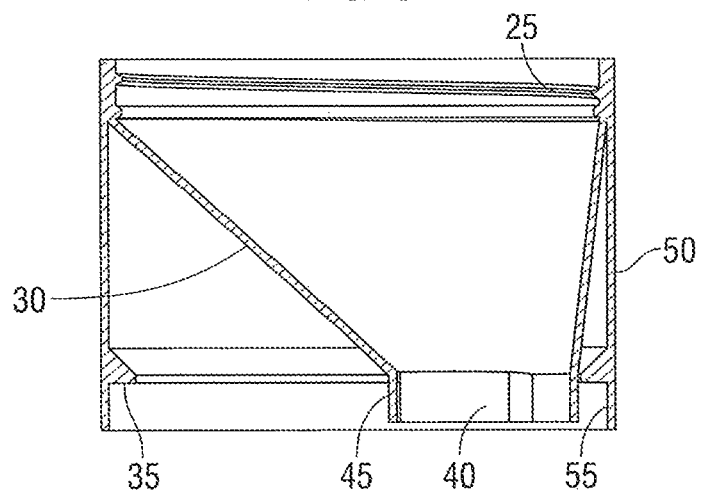
FIG. 10 is an assembled view of one embodiment of the present invention of the bottom cap in cross section.

FIG. 10 is an assembled view of one embodiment of the present invention of the bottom cap in cross section. Lower cap 50, in many embodiments, has a spout 40 with outer edge 45. Frustoconical side slant cone 30, in several embodiments, can act as a funnel for materials when bottom cap 50 is placed over top cap 200 and engaged. The spout 40 aligns inside of an individual compartment 310a-e (See FIG. 3). This allows for more stability when a powder is being poured into compartments 310a-e (See FIG. 3). Also illustrated is bottom side ridge 55 and inner ridge 35.

Figure 11:
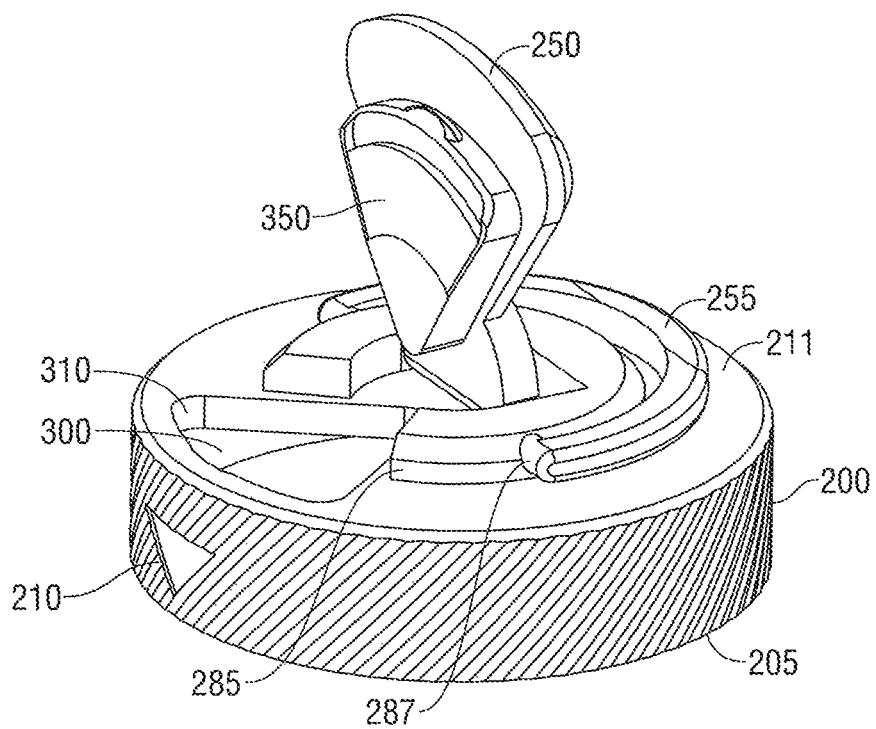
FIG. 11 is an assembled view of one embodiment of the present invention lid with the top lid open.

FIG. 11 is an assembled view of one embodiment of the present invention lid with the top lid open. As illustrated, wedge 350 is raised away from orifice 300. Orifice defining walls 310 do not engage wedge 350. Handle 255 is in the lower position and flat on upper lid surface 211.

Figure 12:
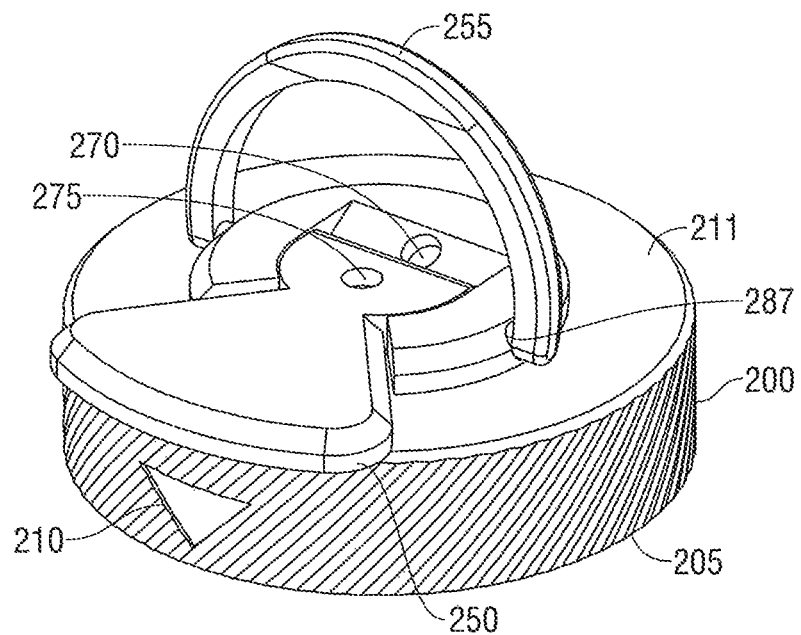
FIG. 12 is an assembled view of one embodiment of the present invention lid with the top handle open.

FIG. 12 is an assembled view of one embodiment of the present invention lid with the top handle open. As shown, handle 255 is rotated about axis 287 so that the handle is not flush with surface 211. Also illustrated is lid 250 which is engaged with orifice 300 (See FIG. 11), wherein wedge 350 (See FIG. 11) is in sealable contact with defining walls 310 (See FIG. 11).

FIG. 13 is an assembled view of one embodiment of the present invention of the bottom cap top. As shown is the lower wedge 350 of lid 250 (See FIG. 11) that is preferably designed to wedge into orifice 300 (See FIG. 11) on cap top 200 (See FIG. 11). Shown also is lid 250 (See FIG. 11), which in some embodiments extends past the circumference of upper cap 200 (See FIG. 11). Interior of upper cap 1200 is preferably designed with a rigid material.

Figure 14:
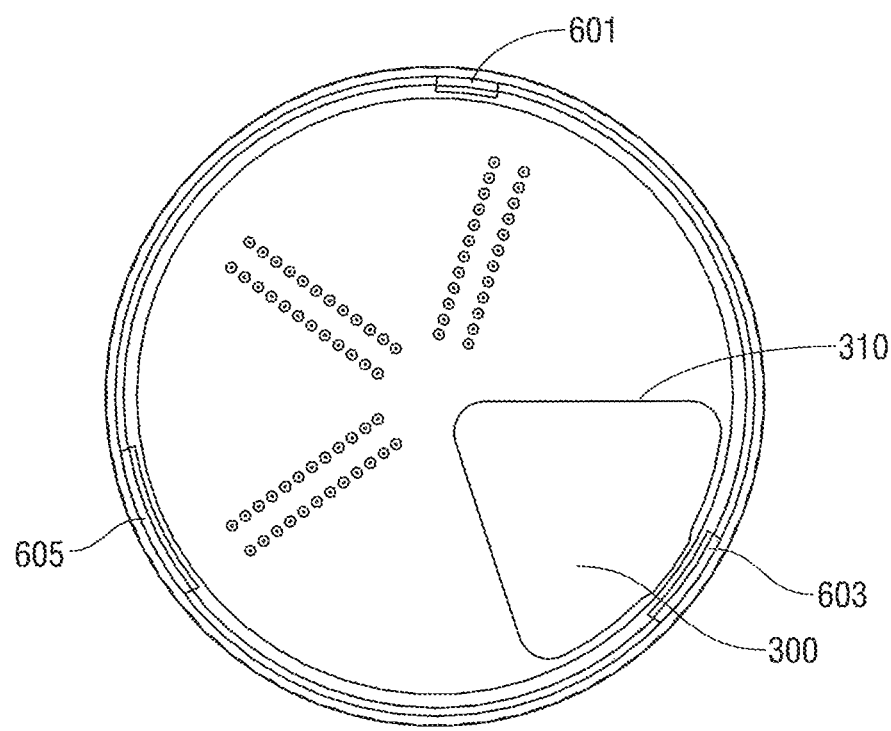
FIG. 14 is an assembled view of one embodiment of the present invention of the top cap bottom.

FIG. 14 is an assembled view of one embodiment of the present invention of the top cap bottom. In this embodiment, orifice 300 is visible without being plugged by wedge 350 (See FIG. 13). Orifice 300 is defined by wall edges 310. In several embodiments of the present invention, when the top cap 200 (See FIG. 1) aligns with the triangles 160 and 210

(See FIG. 1) of the body 150 (See FIG. 1), the user can access the powder within and one of chambers 310a-e (See FIG. 3).

Figure 15:
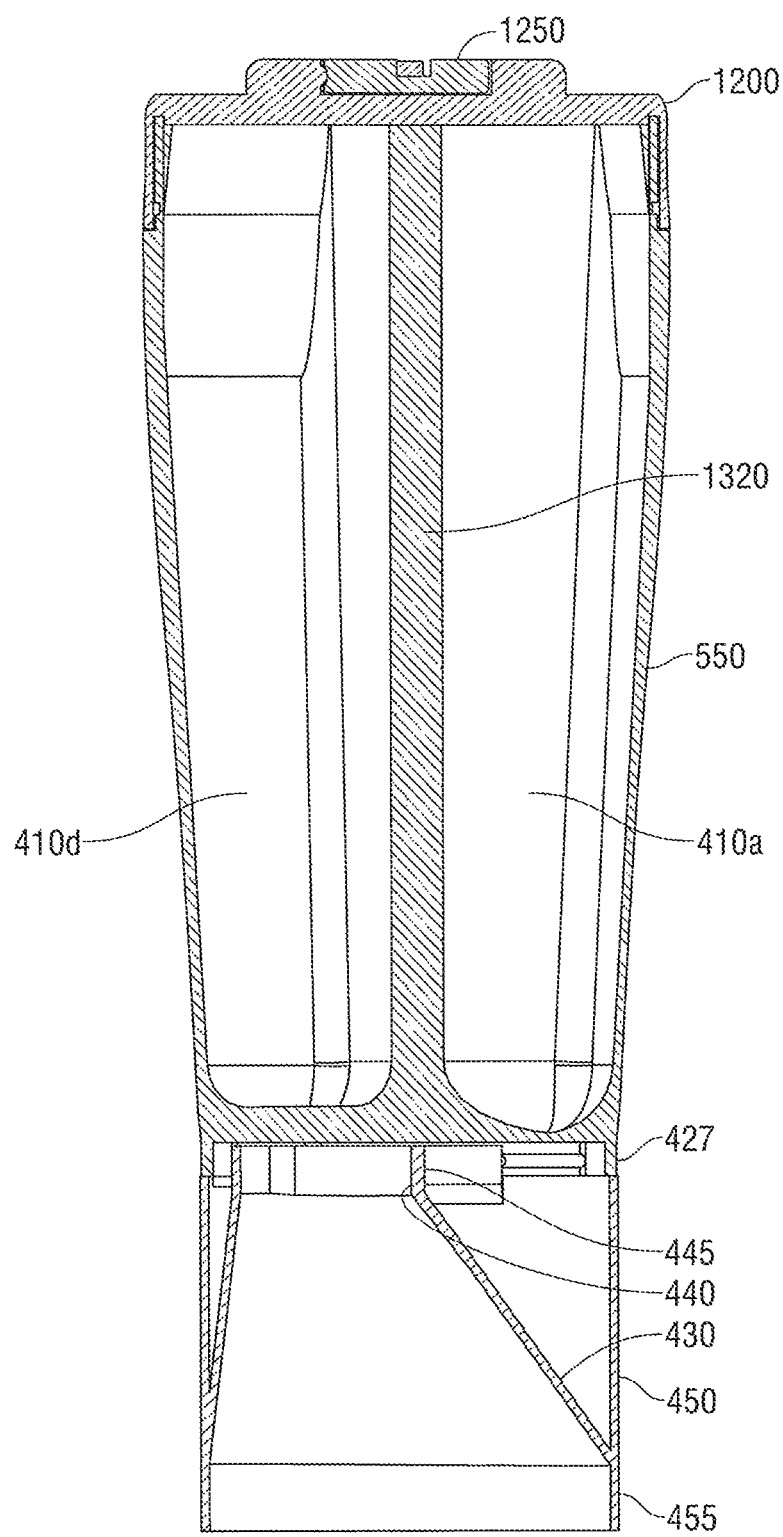
FIG. 15 is an assembly cross section view of one embodiment of the present invention with a tapered body.

FIG. 15 is an assembled cross sectional view of one embodiment of the present invention with a tapered body and alternative lower cap. As illustrated, the interior of containers 410d and 410a are shown so that the capacity for storage of materials is completely appreciated. Divider 1320 is also of variant geometric shape to accommodate the top to bottom taper of body 550 in this embodiment. Cap top 1200 is slightly modified in this embodiment and is molded as a single unit. Also shown is lid 1250 which has no handle 255.

As shown, the upper portions of said containers are of a greater diameter than the lower areas. In this embodiment, threads 27 and 25 (See FIG. 4) are engaged such that bottom cap 50 (See FIG. 4) is in mechanical communication with body 150 (See FIG. 4). Shown is rotational track 227 (See FIG. 4) of body 150 (See FIG. 4) as it engages top cap 200 (See FIG. 4). Shown in this embodiment, lower cap 450 has the frustoconical side slant cone 430. Further shown is the outer edge 445 and the spout 440. Side ridge 455 is also shown.

In this embodiment, lower cap 450 snaps in ridges 427 on lower end of body 550. In this embodiment, spout 440 is then substantially adjacent to the bottom of body 550 when fully assembled.

In several embodiments, the present invention is assembled in the following manner. Bottom cap 50 is attached to the bottom portion of body 150 via threads 25 and 27 (See FIG. 3). Top cap 200 is then attached to body 150 through alignment of triangles 160 and 210 (See FIG. 3), notches 314, 312 and 313 (See FIG. 5) followed by top cap 200 placement on track 146 (See FIG. 3). After placement, triangles 160 and 210 are rotated such that they no longer align, therein locking top cap 200 onto body 150.

In several embodiments, bottom cap 50 can be unscrewed from body 150 so that they are no longer in attachment. After top cap 200 is removed from body 150 via a realigning of triangles 160 and 210, bottom cap 50 can be placed over the top of body 150 such that spout 45 aligns with one of any chambers 310a-e. Once alignment is in place, a user can pour a powder into any one of said chambers 310a-e.

In several embodiments of the present invention, a user cannot rotate cap 200 when the wedge 350 is in sealable contact with defining walls 310. In order to rotate the cap 200, in many embodiments, wedge 350 needs to be removed from contact with defining walls 310.

In several embodiments, the present invention is assembled in the following manner. Bottom cap 450 is attached to the bottom portion of body 550 via snapping into ridge 427. Top cap 1200 is then attached to body 550 through alignment of triangles 160 and 210, notches 314, 312 and 313, followed by top cap 200 placement on track 146. After placement, triangles 160 and 210 are rotated such that they no longer align therein locking top cap 1200 onto body 550.

In several embodiments, bottom cap 450 can be snapped away from body 550 so that they are no longer in attachment. After top cap 1200 is removed from body 550 via a realigning of triangles 160 and 210, bottom cap 450 can be placed over the top of body 550 such that spout 440 aligns with one of any chambers 410a-e. Once alignment is in place, a user can pour a powder into any one of said chambers 410a-e.

In several embodiments of the present invention, a user cannot rotate cap 1200 when the wedge 350 is in sealable contact with defining walls 310. In order to rotate the cap 1200, in many embodiments, wedge 350 needs to be removed from contact with defining walls 310.

Figure 16:
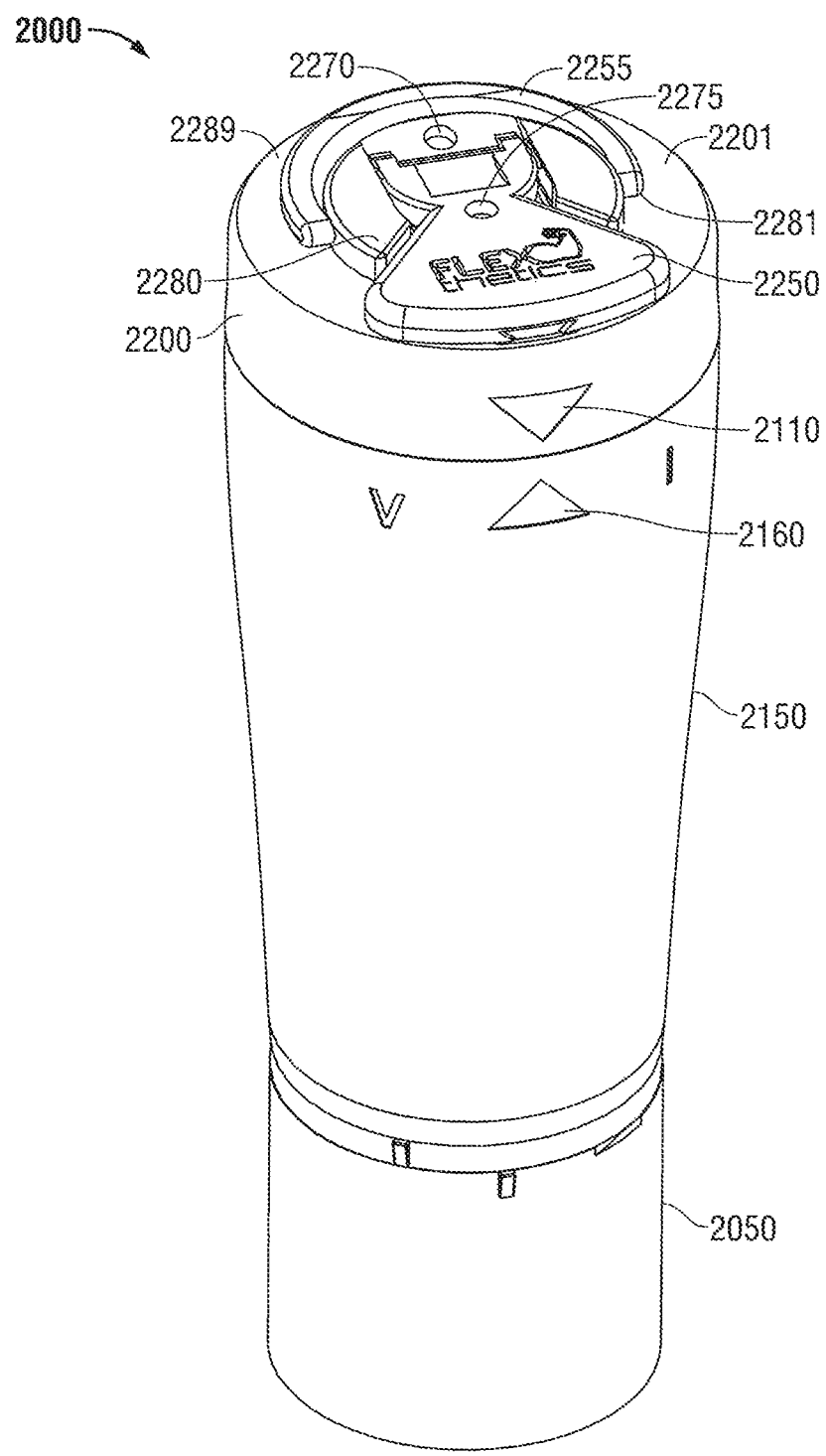
FIG. 16 is an assembled view of one embodiment of the present invention lid with the top lid closed.

FIG. 16 is an assembled view of one embodiment of the present invention with an improved lid. As shown in this embodiment, inventive canister 2000 is composed of multiple assembled units. In several embodiments, the canister 2000 may be constructed of a lightweight plastic, metal, or other durable material. It is also envisioned that the physical shape of the present invention can be modified from a general cylindrical shape into some other shapes as long as the functionality is preserved.

As shown is bottom cap 2050. In several embodiments of the present invention, bottom cap 2050 may be constructed of any materials that are capable of maintaining a rigid shape, such as plastics, light weight metals, or the like. As shown, bottom cap 2050 is releasable attached to main body 2150. In several embodiments, this attachment occurs through threading 25 and 27 (see FIG. 4). Other attachment methods as known in the art can be implemented though. In several embodiments, bottom cap 2050 has an outer wall that is substantially cylindrical in shape.

In several embodiments, body 2150 may be constructed of any materials that are capable of maintaining a rigid shape, such as plastics, light weight metals, or the like. In many embodiments, body 2150 is substantially cylindrical in exterior shape. In several embodiments, main body 2150 may be formed with different shapes.

Body 2150 can also have secondary indentations 2160 utilized to align body 2150 with top cap 2200 in certain uses of the present invention. Where the two triangles on the device 2160 and 2210 meet, the entire cap can be attached.

FIG. 16 also illustrates top cap 2200. Further shown is lid indention 2110, which in some embodiments, can align with indention 2160 when rotated to allow for removal or placement of top cap 2200 on body 2150. Indentions 2110 and 2160 can be of any geometric shape. Top cap 2200 may be constructed of any materials that are capable of maintaining a rigid shape. In several embodiments, where the two triangles on the device 2160 and 2110 meet, the entire cap 2200 can be attached to body 2150.

In several embodiments, top cap 2200 is constructed with lid complex 2289. In several embodiments, lid complex 2289 is constructed with magnetic attachment crevasse 2270, flip lid 2250, second magnetic attachment crevasse 2275, and handle 2255. As shown, handle 2255 is substantially attached and can rotate about base 2281 of complex 2289, such that handle 2255 can rotate away from, or towards, top cap top 2201. Cap top 2200 can be of a variety of different geometric shapes as long as the physical requirements of the present invention are met.

In many embodiments, handle 2255 is preferably constructed in such a manner as to support the weight of the canister invention 2000 (even when filled) through lifting. Handle 2255 may be constructed of any materials that are capable of maintaining a rigid shape.

Figure 17:
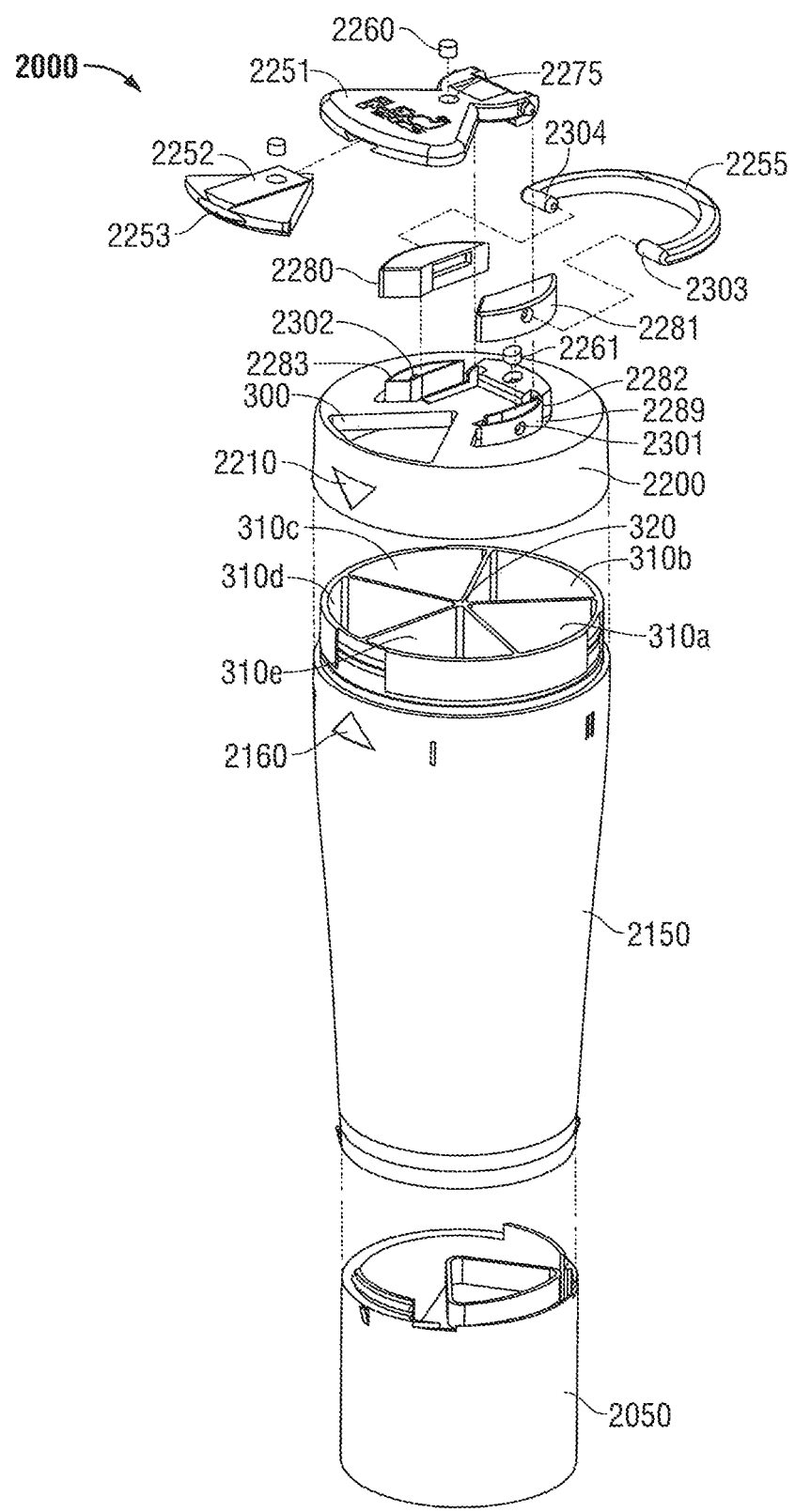
FIG. 17 is an exploded view of one embodiment of the present invention.

FIG. 17 shows an exploded view of one embodiment of the present invention with an improved lid. As shown is bottom cap 2050. Illustrated further are interior compartments 310a-e which are open containment sections with wall divider 320 separating them. In preferred operation, when materials are placed into any one of containers 310a-e they cannot interface with material in another container.

Illustrated further is orifice 300 on top cap 2200 which is designed to preferably align with one of containers 310a-e when in operation by a user such that materials from only one individual container could be removed or placed into one of said containers 310a-e. In several embodiments of the present invention, the interior of containers 310*a-e* is substantially shaped as a wedge with extended depth.

Figure 18A:
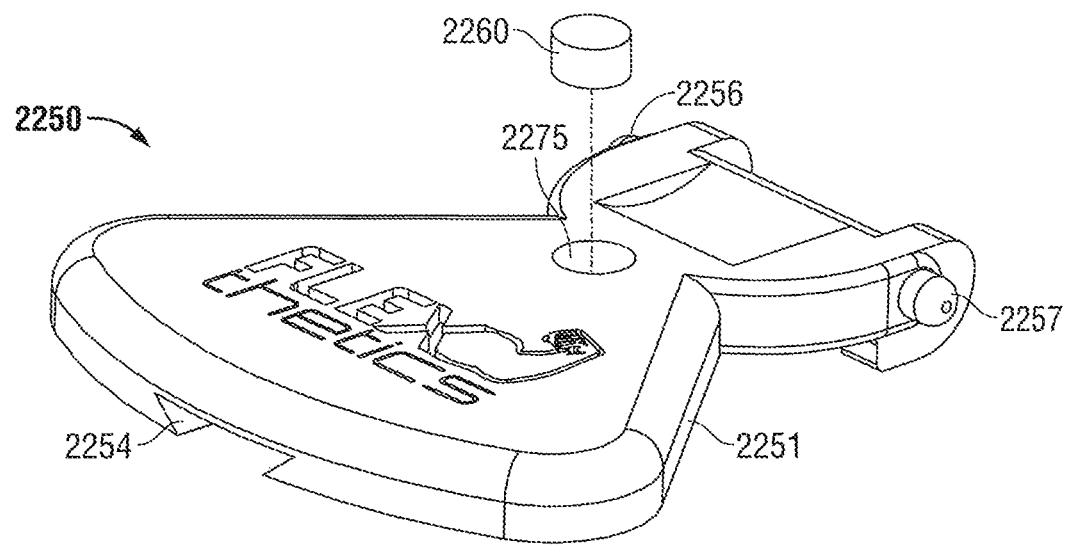
FIG. 18A is a side view of one embodiment of the top lid upper piece.
Figure 18B:
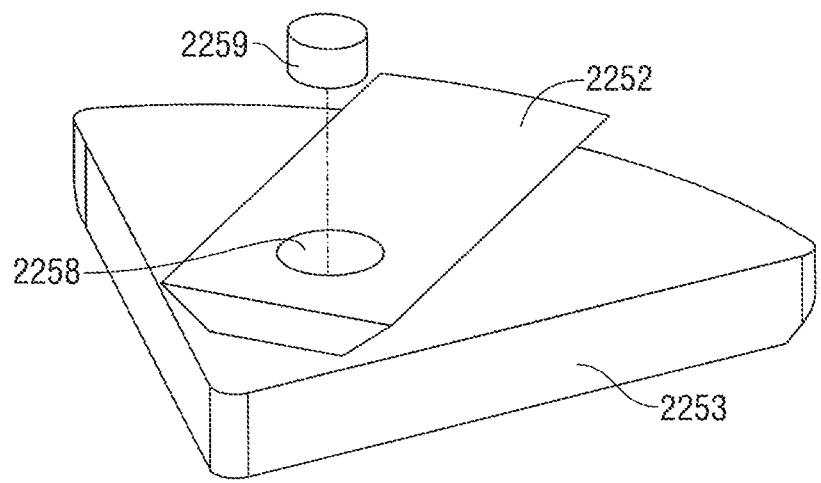
FIG. 18B is a side view of one embodiment of the top lid lower piece.

As shown, one embodiment of the lid complex is constructed in the following manner. Magnetic attachment 2260 is mechanically inserted into crevasse 2275 in a manner in which they are securably engaged. Lid complex 2250 is preferably comprised of top lid upper piece 2251 with crevasse 2275, track engagement knobs 2256 and 2257 and dove tail track 2254 (FIG. 18A). Lid complex 2250 is preferably comprised of top lid lower piece dove tail engagement 2252 and top lid lower piece orifice engagement 2253. (FIGS. 18A and 18 B). Further shown is crevasse 2258 and magnetic engagement article 2259 which can enter and mechanically engage said crevasse 2258 which is preferably located on said dove tail engagement 2252. (FIGS. 18A and 18B).

As further shown, base extensions 2282 and 2283 extend from top cap top 2201 and can engage top cap engagement faces 2280 and 2281. As shown, in several embodiments, top cap engagement faces 2280 and 2281 may be constructed with orifices 2286 and 2284 designed to engage the end knobs of handle 2255. Also shown are guide tracks 2287 and 2288 designed to engage track engagement knobs 2256 and 2257. (FIGS. 17, 18A, 18B, 19A and 19B).

As further shown, clamp orifices 2301 and 2302 on base extensions 2282 and 2283 and are designed to rotating engage clamps 2303 and 2304 respectfully as engaged through engagement faces 2281 and 2280 (FIGS. 16 and 17). Clamps 2303 and 2304 may be constructed of any materials that are capable of maintaining a rigid shape.

FIG. 18A is a side view of one embodiment of the improved top lid upper piece. As illustrated, one embodiment of the lid complex is constructed in the following manner. Magnetic attachment 2260 is mechanically inserted into crevasse 2275 in a manner in which they are securably engaged. Magnetic attachment can be arranged as positive or negative facing in any direction that the user desires. Lid complex 2250 is preferably comprised of top lid upper piece 2251 with crevasse 2275, track engagement knobs 2256 and 2257 and dove tail track 2254. Lid complex 2250 may be constructed of a lightweight plastic, metal, or other durable material. As shown, upper piece 2251 is formed with a lower dove tail track 2254 that is capable of slideably engaging the dove tail engagement 2252 in operation. Also shown are track engagement knobs 2256 and 2257 designed to engage guide tracks 2287 and 2288 (See FIG. 19B) when one embodiment of the present invention is assembled.

As shown in FIG. 18B, lid complex 2250 is also preferably comprised of top lid lower piece dove tail engagement 2252 and top lid lower piece orifice engagement 2253. Further shown is crevasse 2258 and magnetic engagement article 2259 which can enter and mechanically engage said crevasse 2258 which is preferably located on said dove tail engagement 2252. Lower piece orifice engagement 2253 is preferably designed to be able to engage orifice 300 (See FIG. 17) in some embodiments of the present invention.

Figure 19A:
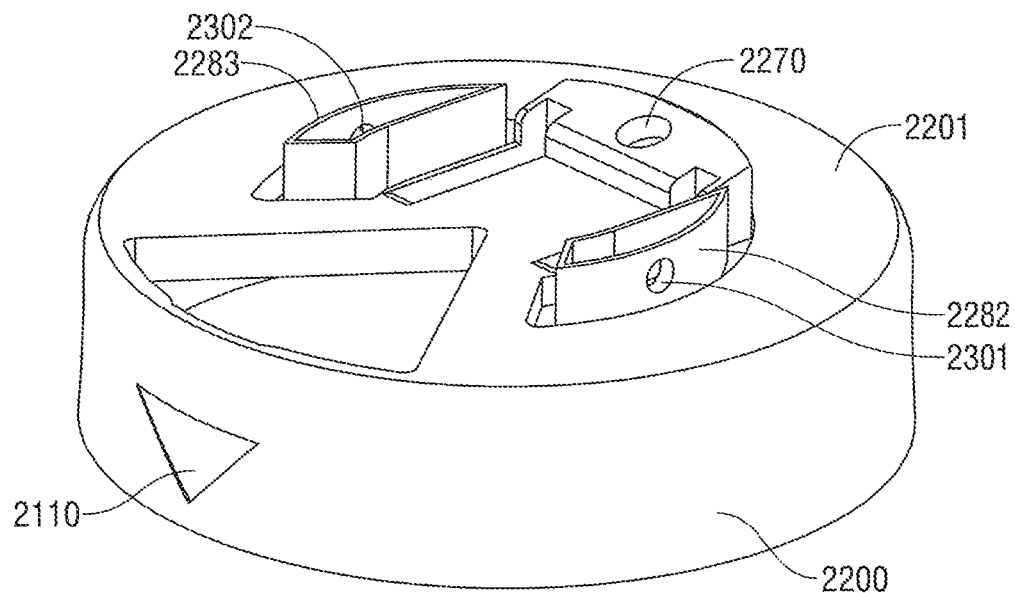
FIG. 19A is a side view of one embodiment of the upper cap base piece.

FIG. 19A is a side view of one embodiment of the improved upper cap base piece. Further shown is lid indention 2110, which in some embodiments, can align with indention 2160 (See FIG. 17) when rotated to allow for removal or placement of top cap 2200 on body 2150 (See FIG. 17). Indentions 2110 and 2160 can be of any geometric shape. Top cap 2200 may be constructed of any materials that are capable of maintaining a rigid shape. In several embodiments, where the two triangles on the device 2160 and 2110 meet, the entire cap 2200 can be attached to body 2150. Further shown are base extensions 2282 and 2283 which extend from top cap top 2201 and can engage top cap engagement faces 2280 and 2281 (See FIG. 19B). In several embodiments, base extensions 2282 and 2283 are designed to mechanically engage engagement faces 2280 and 2281 in such a manner as to prevent engagement faces 2280 and 2281 from being removed in standard mechanical conditions. Base extensions 2282 and 2283 may be constructed of a lightweight plastic, metal, or other durable material. As further shown, clamp orifices 2301 and 2302 on base extensions 2282 and 2283 are designed to rotatably engage clamps 2303 and 2304, respectfully, engaged through engagement faces 2281 and 2280 (See FIGS. 16 and 17). Clamps 2303 and 2304 may be constructed of any materials that are capable of maintaining a rigid shape.

Figure 19B:
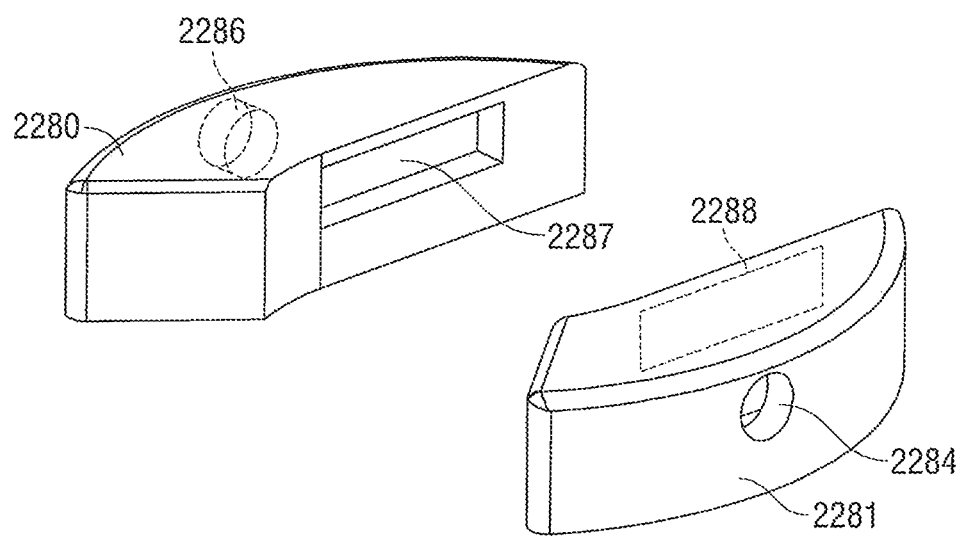
FIG. 19B is a side view of one embodiment of the upper cap base piece knob caps.

As shown in FIG. 19B, in several embodiments, engagement top cap engagement faces 2280 and 2281 may be constructed with orifices 2286 and 2284 designed to engage the end knobs of handle 2255 (See FIG. 17). Engagement faces 2282 and 2283 may be constructed of a lightweight plastic, metal, or other durable material. Also shown are guide tracks 2287 and 2288 which are hollowed into engagement faces 2282 and 2283 (See FIG. 19A) designed to engage track engagement knobs 2256 and 2257 (See FIG. 18A).

In operation, in some embodiments, the top cap 2200 of the present invention assembles as follows: all magnetic engagement articles 2259, 2260 and 2261 are secured in their respective crevasses. Next top lid lower piece orifice engagement 2253 is inserted into dove tail track 2254 via dove tail engagement 2252. Once top cap 2200, of the present invention, is secured to the body 2150, at substantially the same time, before, or after the preceding step, top cap engagement faces 2280 and 2281 are engaged with engagement faces 2283 and 2282 such that guide tracks 2287 and 2288 are facing each other. Next, lid complex 2250 is snapped into guide tracks 2287 and 2288 via track engagement knobs 2256 and 2257 in a mechanical manner such that track engagement knobs 2256 and 2257 can move through the guide tracks 2287 and 2288 in a straight line manner. Lid complex 2250 is attached to guide tracks 2287 and 2288 such that magnetic engagement article 2260 is facing away from top cap top 2201.

In some embodiments, when engaged, lid complex 2250 is flush with top cap 2200, lower piece orifice engagement 2253 is positioned slideably in dovetail track 2254 such that magnetic engagement articles 2260 and 2259 can engage each other in magnetic attraction therein keeping top lid upper piece 2251 from sliding or moving about the guide tracks 2287 and 2288 via track engagement knobs 2256 and 2257 without external force application.

In some embodiments, if a user wants to move lid upper piece 2251 once the lid complex 2250 is flush with top cap 2200, a user can manually move lid upper piece 2251 by sliding or moving about the guide tracks 2287 and 2288 via track engagement knobs 2256 and 2257 by external force application. When lid upper piece 2251 exceeds the diameter of top cap 2200, a user can then disengage lower piece orifice engagement 2253 by rotating lid upper piece 2251 in a rotational manner about engagement knobs 2256 and 2257. If a user then desires, he can sufficiently continue such rotation as to allow for magnetic engagement articles 2260 and 2259 to engage each other in magnetic attraction therein keeping top lid upper piece 2251 from sliding or moving.

While preferred embodiments have been shown, and described, modifications thereof can be made by one skilled in the art without departing from the scope or teaching herein. The embodiments described herein are exemplary only and are not limiting. Many variations and modifications of the system and apparatus are possible and will become apparent to those skilled in the art once the above disclosure is fully appreciated. For example, the relative dimensions of various parts, the materials from which the various parts are made, and other parameters can be varied. Accordingly, it is intended that the following claims be interpreted to embrace all such variations and modification.

The invention claimed is:

1. A materials containment canister comprising:
a body;
said body is substantially hollow with multiple chambers running the length of the interior of said body and being separated by a multi-walled divider;
said body is comprised with an upper body track;
said upper body track has an upper cap interface;
an upper cap;
said upper cap further comprising a top cap top, a base and a lid complex;
said top cap top further comprising;
base extension and engagement face with guide tracks;
said lid complex further comprising;
a lid upper piece with engagement knobs and a dove tail track;
a lower piece orifice engagement and a dove tail engagement.

2. The materials containment canister of claim 1 further comprising:
said base has a first magnetic attachment on the upper face of said base;
said lid has a second magnetic attachment on the upper face of said lid of opposing polarity to said first attachment; wherein said first and second magnetic attachments are capable of magnetically engaging each other therein maintaining said lid in mechanical communication with said base;
said base extension has a third magnetic attachment of opposing polarity to said second attachment; wherein said third and second magnetic attachments are capable of magnetically engaging each other.

3. The materials containment canister of claim 1 further comprising:
said body is further constructed with grips.

4. The materials containment canister of claim 1 further comprising:
said body is further constructed with indentions on the upper surface that correspond with the locations of one of said multiple chambers in the interior of said body.

5. The materials containment canister of claim 1 further comprising:
said body is further constructed with an indentation on said lid that corresponds with the location of said orifice.

6. The materials containment canister of claim 1 further comprising:
a lower cap;
said lower cap further comprising a lower cap upper thread;
said lower cap further comprising a lower cap upper thread, a frustoconical side slant cone, and a spout attached to the edge of said frustoconical side slant cone;
said body is further comprised with a lower body thread capable of engaging said lower cap upper thread.

7. The materials containment canister of claim 6 further comprising:
said body is threadably attached to said lower cap.

8. The materials containment canister of claim 6 further comprising:
said body is tapered from the area nearest the upper cap to the area nearest the lower cap.

9. A method for using a materials containment canister comprising the steps of:
providing a materials containment canister comprising;
a body;
said body is substantially hollow with multiple chambers running the length of the interior of said body and being separated by a multi-walled divider;
said body is comprised with an upper body track;
said upper body track has an upper cap interface;
an upper cap;
said upper cap further comprising a top cap top, a base, and a lid complex;
said top cap top further comprising;
base extensions and engagement faced with guide tracks;
said lid complex further comprising;
a lid upper piece with engagement knobs and a dove tail track; and
a lower piece orifice engagement and a dove tail engagement.

10. The method of claim 9 for using a materials containment canister further comprising:
said base has a first magnetic attachment on the upper face of said base;
said lid has a second magnetic attachment on the upper face of said lid of opposing polarity to said first attachment; wherein said first and second magnetic attachments are capable of magnetically engaging each other therein maintaining said lid in mechanical communication with said base;
said base extension has a third magnetic attachment of opposing polarity to said second attachment; wherein said third and second magnetic attachments are capable of magnetically engaging each other.

11. The method of claim 9 for using a materials containment canister further comprising the step of:
constructing said body with grips.

12. The method of claim 9 for using a materials containment canister further comprising the step of:
constructing said body with indentions on the upper surface that correspond with the locations of one of said multiple chambers in the interior of said body.

13. The method of claim 9 for using a materials containment canister further comprising the step of:
constructing said body with an indentation on said lid that corresponds with the location of said orifice.

14. The method of claim 9 for using a materials containment canister further comprising the step of:
providing a lower cap;
said lower cap further comprising a lower cap upper thread;
said lower cap further comprising a lower cap upper thread, a frustoconical side slant cone, and a spout attached to the edge of said frustoconical side slant cone;
said body is further comprised with a lower body thread capable of engaging said lower cap upper thread.

15. The method of claim 14 for using a materials containment canister further comprising the step of:
threadably attaching said body to said lower cap.

16. A materials containment canister comprising:
a body;
   said body is substantially hollow with multiple chambers running the length of the interior of said body and being separated by a multi-walled divider;
   said body is comprised with an upper body track;
   said upper body track has an upper cap interface;
an upper cap;
   said upper cap further comprising a top cap top and a lid complex;
     said top cap top further comprising;
       base extensions and engagement faced with guide tracks;
   said lid complex further comprising;
     a lid upper piece with engagement knobs and a dove tail track; and
     a lower piece orifice engagement and a dove tail engagement.

17. The materials containment canister of claim 16 further comprising:
   a lower cap;
     said lower cap further comprising a lower cap upper thread;
     said lower cap further comprising a lower cap upper thread, a frustoconical side slant cone, and a spout attached to the edge of said frustoconical side slant cone;
   said body is further comprised with a lower body thread capable of engaging said lower cap upper thread.

18. The materials containment canister of claim 17 further comprising:
   said body is threadably attached to said lower cap.

19. The materials containment canister of claim 17 further comprising:
   said body is tapered from the area nearest the upper cap to the area nearest the lower cap.

* * * * *